United States Patent [19]

Wada

[11] 3,712,552

[45] Jan. 23, 1973

[54] STOPPER FOR A TAPE REEL OF A TAPE CARTRIDGE

[76] Inventor: Eiihi Wada, 174, Aigashi-kubo-machi, Nishi-ku, Yokohama-shi, Kanagawa, Japan

[22] Filed: June 5, 1970

[21] Appl. No.: 43,922

[30] Foreign Application Priority Data

June 7, 1969 Japan ..............................44/53567

[52] U.S. Cl. ...........242/55.19 A, 352/78 R, 352/126

[51] Int. Cl. ..............................................B65h 17/48

[58] Field of Search...242/55.19, 55.19 A; 352/78 R, 352/78 C, 126, 34

[56] References Cited

UNITED STATES PATENTS 3,466,123 9/1969 Skuja...............................352/126 X
3,285,526 11/1966 Moore..........................242/55.19 A
3,304,019 2/1967 Myers...........................242/55.19 A

FOREIGN PATENTS OR APPLICATIONS 1,042,025 9/1966 England.......................242/55.19 A

*Primary Examiner*—Stanley N. Gilreath
*Assistant Examiner*—Milton S. Gerstein
*Attorney*—Sughrue, Rothwell, Mion, Zinn & Macpeak

[57] ABSTRACT

A brake arrangement for a tape reel of a tape cartridge has a lever pivotally secured to the cartridge outside of the tape reel periphery and has a first brake mounted on the reel side of one end thereof for stopping the tape reel. A spring secured adjacent to said lever depresses the lever against the tape reel. A second brake is mounted on the end of the lever and a pinch roller is mounted on the other side of the same end of the lever. This stops the rotation of the tape reel when it is not in the recorder or is not played while set into the tape recorder.

3 Claims, 3 Drawing Figures

INVENTOR
EIIHI WADA

BY Sughrue, Rothwell, Mion, Zinn & Macpeak
ATTORNEYS

STOPPER FOR A TAPE REEL OF A TAPE CARTRIDGE

BACKGROUND OF THE INVENTION

1. Field of the Invention

This invention relates to a tape cartridge for use in a multiple cartridge tape recorder such as that shown in U.S. Pat. No. 3,221,963, and more particularly to a brake arrangement for a tape reel of the tape cartridge which employs a pinch roller therein.

2. Description of the Prior Art

It is well known to provide a pinch roller within the cartridge of a tape recorder and mounted to the casing of the cartridge. For this reason, when the cartridge is not used, it must have a stop or brake for stopping the tape reel in addition to the pinch roller, with the result that such structures become complicated. Further, if the tape recorder has plural cartridges, when only one of the cartridges is used, the other tape reels cannot be stopped. Accordingly, the other cartridge reel which is not played tends to move due to the vibration thereof so that the tape becomes slack and entangled.

SUMMARY OF THE INVENTION

This invention eliminates the aforementioned disadvantages of the conventional device and provides a novel and improved brake arrangement for a tape reel of a tape cartridge which is adapted to stop the rotation of the tape reel when it is not used.

According to one aspect of the present invention, there is provided a brake arrangement for a tape reel of a tape cartridge which comprises a lever pivotally secured to the cartridge outside of the tape reel periphery. A first brake is mounted on the reel side of one end thereof for stopping the rotation of the tape reel when the tape cartridge is not in the player. A pinch roller is mounted on the other end of the lever and upon releasing the first brake by the rotation of the lever upon operation of a tape recorder engages the tape. A second brake is also mounted on the other end of the lever for stopping the rotation of the tape reels other than the one played when plural cartridges are provided. Thus, this invention eliminates unpreferable slack and entangled states of such tapes with a simple structural arrangement.

Other objects, advantages and features of the present invention will become apparent from the following description taken in conjunction with the accompanying drawings.

DESCRIPTION OF THE PREFERRED EMBODIMENTS

Figure 1:
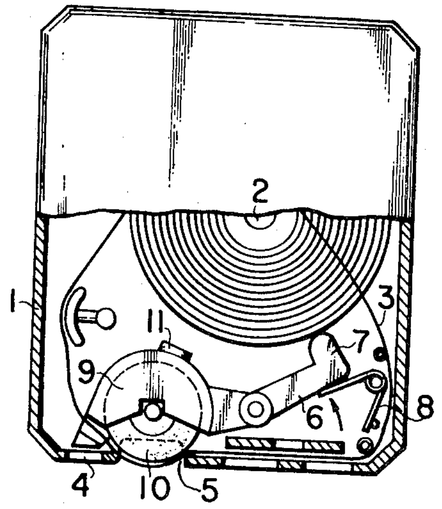
FIG. 1 is a fragmentary plan view of one embodiment of a tape cartridge provided with a brake arrangement in accordance with the present invention illustrating the tape cartridge when not set into a tape recorder.

Reference is now made to the drawings, in which one embodiment of this invention is illustrated. The tape cartridge comprises mainly an outer casing or housing 1, a tape reel 2 which is rotatably attached thereto and an endless tape 3 which is wound on the reel 2. On the bottom side of the casing 1, facing a capstan 12, the tape recorder is provided with a window 5 and an auxiliary window 4, and overlying the same is a lever 6 which is pivotally secured.

The first brake 7 is mounted on one end of the lever 6 and faces the tape 3 wound on the reel 2 and is urged onto the tape 3 by a leaf spring 8 mounted inside of the casing 1. On the other end of the lever 6 is mounted a roller cover 9 to which is rotatably mounted a pinch roller 10 which faces the window 5 across which part of the tape 3 fed from the reel 2 extends. A second brake 11 faces with the tape 3 wound on the reel 2 and is carried by the roller cover 9.

The tape cartridge 1 is made primarily for use in a multiple cartridge tape recorder. The cartridge can be thought of as having three states, the first when the cartridge is withdrawn from the recorder, the second when the cartridge is in the recorder and is being played, and the third when the cartridge is in the recorder but not being played. When a plurality of cartridges are in the recorder only one is in a playing state at any one time.

In operation of thus constructed tape cartridge, when it is removed from the tape recorder, as shown in FIG. 1, the first brake 7 holds the tape reel 2 through the tape 3 wound thereon by the tension of the leaf spring 8 due to contact with the tape. For this reason, the tape reel 2 does not rotate even though vibration occurs. This corresponds to the first state.

Figure 2:
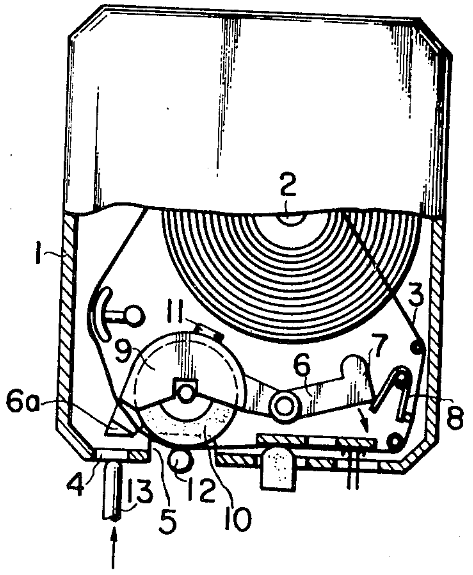
FIG. 2 is a plan view similar to FIG. 1, but showing the state when the tape cartridge is playing.

In such a state, if the cartridge is inserted into the tape recorder, and if the tape recorder is played by depressing the pinch roller 10 by means (not shown) forcing the tape 3 wound on the reel 2 against the capstan 12 at the window 5 as shown in FIG. 2, the lever 6 pivots against the tension of the leaf spring 8 so to separate the first brake 7 from the tape 3. In this case, though the second brake 11 approaches the tape 3, it does not contact the same. Accordingly, both the brakes 7 and 11 are separate from the tape 3, so that the tape reel 2 may rotate without any trouble with movement of the tape 3 during play of the tape recorder. This corresponds to the second state.

Figure 3:
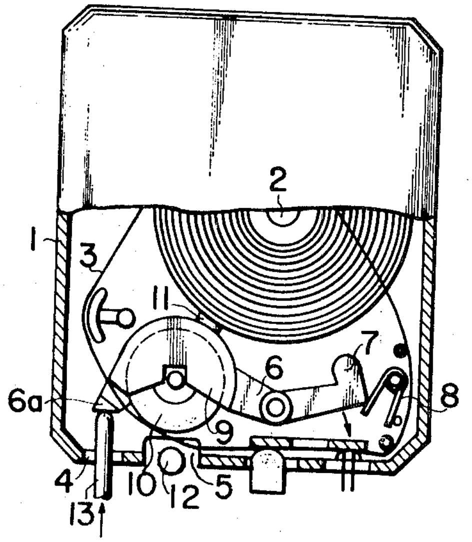
FIG. 3 is a plan view similar to FIG. 1, but showing the tape cartridge when set into the tape recorder but not being played.

If the tape recorder has a plurality of cartridges, when one of the cartridges is played, a rod 13 for each of the other cartridges is inserted through the auxiliary window 4 by a switching mechanism (not shown, but which may be of a manually operated lever type mechanism) so that the other end **6*a* of the lever 6 is depressed towards the reel 2 as shown in FIG. 3, with the result that the lever 6 is further pivoted clockwise so that the second brake 11 holds the tape reel 2 through the tape 3** wound thereon so as to prevent it from rotating. This corresponds to the third state.

If the depression of the pinch roller 10 or the other end **6*a* of the lever 6 is released by the capstan 12 or the rod 13 in the state shown in FIGS. 2 and 3, the lever 6 is reversely rotated by the tension of the leaf spring 8 so that the rotation of the tape reel 2 is now prevented by the first brake 7** as illustrated in FIG. 1.

It should be understood from the foregoing description that since the tape cartridge of the present invention has first and second brakes and a pinch roller carried by a lever pivotally secured to the tape cartridge under bias of a spring, a simple structure results whereby the tape reel is stopped by the first brake when the tape recorder is not in use and the cartridge is withdrawn from the recorder. Further, when a plurality of tapes are inserted in the recorder the second brake automatically stops the tape on all of the cartridges except the one being played.

What is claimed is:

1. A brake arrangement for tape cartridges for use in a tape recorder carrying multiple tape cartridges, said tape recorder including capstan means for selectively driving the tape within only one of said cartridges and displaceable means acting on the other of said cartridges, said brake arrangement comprising: a lever pivotably secured within each cartridge intermediate of its ends and outside the tape reel periphery, first spring biased braking means on the reel side of one end of said lever for braking the tape reel when the cartridge is removed from the tape recorder, a pinch roller mounted on the other end of said lever for pressing said tape against said tape drive capstan and normally biased out of contact therewith, the improvement comprising:

second brake means carried on the same end of said lever as said pinch roller and on the side facing said tape reel periphery and spaced from the reel periphery when the pinch roller presses said tape against said capstan drive means, said second brake means being forced against said tape periphery by said displaceable means when said tape is in said tape recorder by not being driven by said capstan, thereby preventing the loosening of said tape when it is not being driven.

2. The brake arrangement as set forth in claim 1, wherein said first braking means comprises a friction brake mounted on the reel side of one end of said lever and said second braking means comprises a friction brake mounted on the other end of the same lever.

3. The brake arrangement as claimed in claim 1, wherein each cartridge includes a first window permitting said pinch roller to press said tape within said cartridge against a capstan external of the same, and each cartridge includes a second window spaced therefrom and in line with said pivotable lever and wherein said displaceable means comprises a rod which is selectively inserted within said second window for contacting said lever.

* * * * *